United States Patent
Koteshwara et al.

(10) Patent No.: US 11,663,009 B2
(45) Date of Patent: May 30, 2023

(54) SUPPORTING LARGE-WORD OPERATIONS IN A REDUCED INSTRUCTION SET COMPUTER ("RISC") PROCESSOR

(71) Applicant: INTERNATIONAL BUSINESS MACHINES CORPORATION, Armonk, NY (US)

(72) Inventors: Sandhya Koteshwara, White Plains, NY (US); Kattamuri Ekanadham, Mohegan Lake, NY (US); Manoj Kumar, Yorktown Heights, NY (US); Jose E. Moreira, Irvington, NY (US); Pratap C. Pattnaik, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/450,987

(22) Filed: Oct. 14, 2021

(65) Prior Publication Data

US 2023/0124185 A1 Apr. 20, 2023

(51) Int. Cl.
*G06F 9/30* (2018.01)
*G06F 21/60* (2013.01)
(Continued)

(52) U.S. Cl.
CPC ...... *G06F 9/30145* (2013.01); *G06F 9/30079* (2013.01); *G06F 9/30101* (2013.01);
(Continued)

(58) Field of Classification Search
CPC ............. G06F 9/30145; G06F 9/30079; G06F 9/30101; G06F 9/3877; G06F 21/602; H04L 9/3236; H04L 9/3247
See application file for complete search history.

(56) References Cited

U.S. PATENT DOCUMENTS 7,305,567 B1 12/2007 Hussain et al.
7,620,821 B1 * 11/2009 Grohoski .............. G06F 9/3851
380/37
(Continued)

FOREIGN PATENT DOCUMENTS

CN 101201811 A 6/2008
CN 103477341 B 12/2013
(Continued)

OTHER PUBLICATIONS

Rawat, H. K., & Schaumont, P., "SIMD Instruction Set Extensions for Keccak with Applications to SHA-3, Keyak and Ketje.", In Proceedings of the Hardware and Architectural Support for Security and Privacy 2016 (pp. 1-8).
(Continued)

*Primary Examiner* — Corey S Faherty
(74) *Attorney, Agent, or Firm* — Griffiths & Seaton PLLC

(57) ABSTRACT

A Reduced Instruction Set Computer ("RISC") supporting large-word operations in a computing environment is disclosed. In one implementation, in response to receiving one or more control signals from a central processing unit ("CPU"), a set of operations are executed on a state of a special purpose execution unit ("SPU") having a plurality of SPU registers, the SPU being associated with the CPU and the state of the SPU having word widths of one or more of
(Continued)

the plurality of registers being greater in size than word widths of a plurality of CPU registers of a computing system and a set of state-master bits to synchronize the state of the SPU and a state of the CPU. The results of the set of operations are stored in the plurality of CPU registers or an alternative set of the plurality of SPU registers.

20 Claims, 11 Drawing Sheets

(51) Int. Cl.
  *G06F 9/38* (2018.01)
  *H04L 9/32* (2006.01)
(52) U.S. Cl.
  CPC .......... *G06F 9/3877* (2013.01); *G06F 21/602* (2013.01); *H04L 9/3236* (2013.01); *H04L 9/3247* (2013.01)

(56) References Cited

U.S. PATENT DOCUMENTS

| | | | |
|---|---|---|---|
| 7,962,906 B2 | 6/2011 | O'Brien et al. | |
| 8,166,281 B2 | 4/2012 | Gschwind et al. | |
| 9,772,845 B2 | 9/2017 | Yap et al. | |
| 11,232,213 B2* | 1/2022 | Villegas | G06F 21/602 |
| 2009/0172363 A1* | 7/2009 | Orenstien | G06F 9/3885 712/225 |
| 2014/0189713 A1* | 7/2014 | Ben-Kiki | G06F 9/3877 718/108 |

FOREIGN PATENT DOCUMENTS

| | | |
|---|---|---|
| CN | 103716150 A | 4/2014 |
| CN | 111752609 A | 10/2020 |

OTHER PUBLICATIONS

Rawat, Hemendra K., "Vector Instruction Set Extensions for Efficient and Reliable Computation of Keccak", Thesis, Virginia Polytechnic Institute and State University, Aug. 10, 2016, (p. 76).

Xue et al., "A RISC-V Processor with Are-Efficient Memristor-Based In-Memory Computing for Hash Algorithm in Blockchain Applications", Micromachines, State Key Laboratory of ASIC and System, Fudan University, Shanghai 201203, China, Aug. 2019, (pp. 16).

Gschwind et al., "Workload acceleration with the IBM Power vector-scalar architecture", IBM Journal of Research and Development, vol. 60, No. 2/3, paper 14, Mar. 2016, (pp. 19).

Yumbul et al., "Design and implementation of a versatile cryptographic unit for RISC processors", Published on Wiley Online Library, May 2012, Security Comm. Networks 2014; 7:36-52, (pp. 17).

* cited by examiner

SUPPORTING LARGE-WORD OPERATIONS IN A REDUCED INSTRUCTION SET COMPUTER ("RISC") PROCESSOR

BACKGROUND

The present invention relates in general to computing systems, and more particularly, to various embodiments for supporting large-word operations in a Reduced Instruction Set Computer ("RISC") in a computing environment using a computing processor.

SUMMARY

According to an embodiment of the present invention, a method for supporting large-word operations in a Reduced Instruction Set Computer ("RISC") in a computing environment, by one or more processors, is depicted. In one implementation, in response to receiving one or more control signals from a central processing unit ("CPU"), a set of operations are executed on a state of a special purpose execution unit ("SPU") having a plurality of SPU registers, the SPU being associated with the CPU and the state of the SPU having word widths of one or more of the plurality of registers being greater in size than word widths of a plurality of CPU registers of a computing system and a set of state-master bits to synchronize the state of the SPU and a state of the CPU. The results of the set of operations are stored in the plurality of CPU registers or an alternative set of the plurality of SPU registers.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments for supporting large-word operations in a Reduced Instruction Set Computer ("RISC") are provided.

DETAILED DESCRIPTION OF THE DRAWINGS

Figure 1:
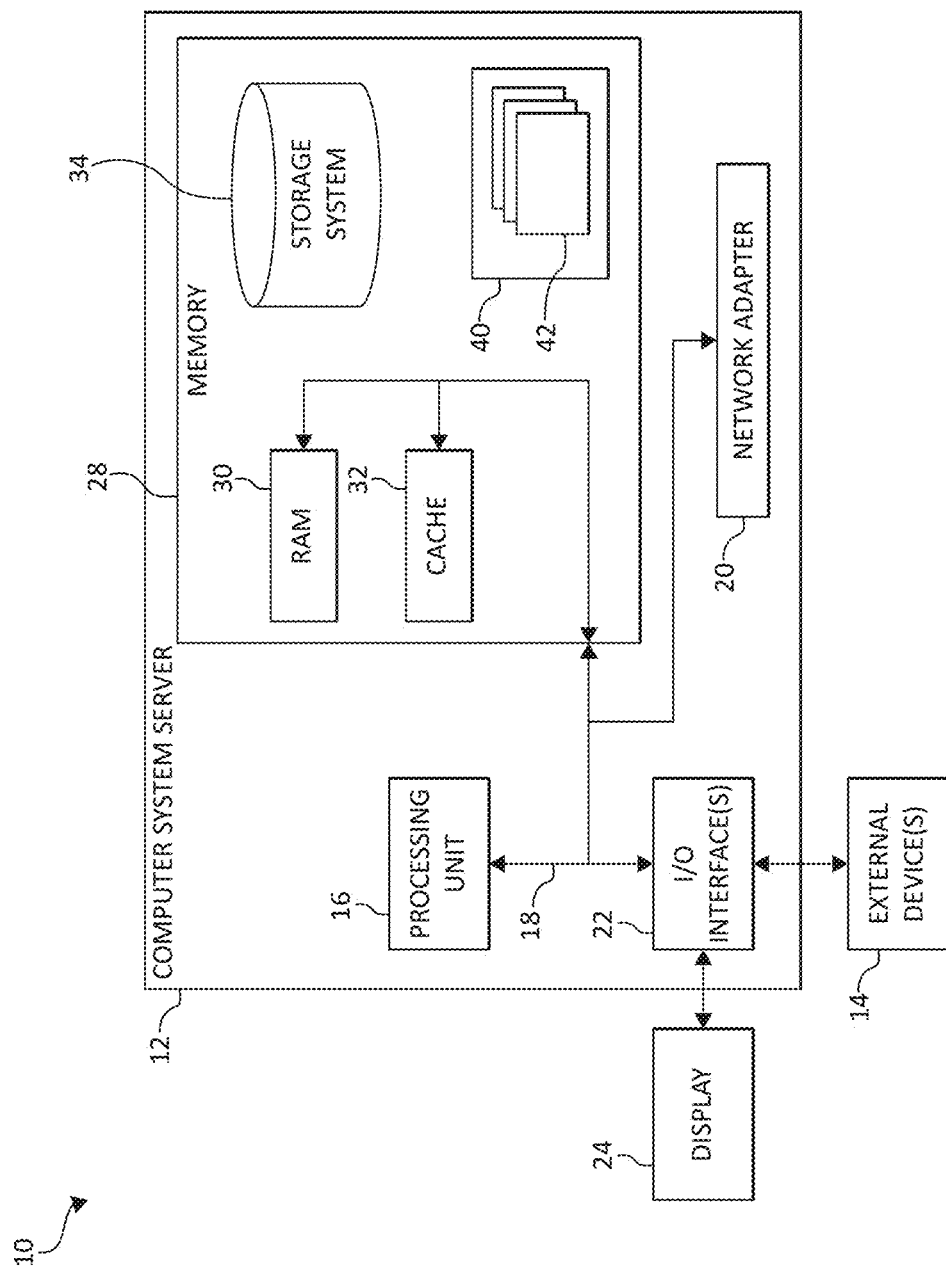
FIG. 1 is a block diagram depicting an exemplary cloud computing node according to an embodiment of the present invention.

The present invention relates generally to the field of computers, and more specifically, to supporting large-word operations in a Reduced Instruction Set Computer ("RISC") in a computing environment and the like.

Modern-day RISC processors use computer hardware to perform integer-arithmetic and logic operations on input operands of fixed width w. For example, in some RISC processors, operations may be performed such as, for example, an ADD, XOR or MULTIPLY on integer operands in the range $[0, 2^w-1]$ or $[-2^{w-1}, 2^{w-1}-1]$. These operands are stored in registers in a register file. Typically, the width w of the register file is 32 or 64 bits.

Many important computations, such as, for example, the secure hash algorithm-3 ("SHA-3") (or cryptography hash algorithms), published by the National Institute of Standards and Technology (NIST Institute (USA)) as the U.S. Federal Information Processing Standard ("FIPS" standard), for permutation-based hash functions, modify state that is much larger than the register width w of a RISC processor. Secure hash algorithms such as, for example, SHA-1, SHA-2 (SHA-224, SHA-256, SHA-384, SHA-512, SHA-512/224 and SHA-512/256) and SHA-3 (SHA3-224, SHA3-256, SHA3-384, SHA3-512) are for computing a unique representation of electronic data (message). A hash function is a function on binary data (i.e., bit strings) for which the length of the output is fixed. For hash functions, the input is called the message, and the output is called the (message) digest or the hash value. The length of the message can vary; the length of the digest is fixed. A cryptographic hash function is a hash function that is designed to provide special properties, including collision resistance and preimage resistance, that are important for many applications in information security. For example, a cryptographic hash function increases the security and efficiency of a digital signature scheme when the digest is digitally signed instead of the message itself. In this context, the collision resistance of the hash function provides assurance that the original message could not have been altered to a different message with the same hash value, and hence, the same signature.

Each of the SHA-1, SHA-2 (SHA-224, SHA-256, SHA-384, SHA-512, SHA-512/224 and SHA-512/256), SHA-3 (SHA3-224, SHA3-256, SHA3-384, SHA3-512) algorithms can be described in two stages: preprocessing and hash computation. Preprocessing involves padding a message, parsing the padded message into m-bit blocks, and setting initialization values to be used in the hash computation. The hash computation generates a message schedule from the padded message and uses that schedule, along with functions, constants, and word operations to iteratively generate a series of hash values. The final hash value generated by the hash computation is used to determine the message digest. It should be noted that as used herein, a word may be a group of either 32 bits (4 bytes) or 64 bits (8 bytes), depending on the secure hash algorithm. In another aspect, a "word" may be a w-bit string (e.g., width w) that may be represented as a sequence of hex digits. An integer may be represented as a word or pair of words. A word representation of the message length, l, in bits, is required for padding.

The state modified by SHA-3 is 1600 bits. Furthermore, it is desirable to perform these computations expeditiously in dedicated hardware, without incurring the overhead of breaking a large word into smaller w-wide elements, performing the needed elemental operations on the w-wide elements, moving intermediate results between the elemental operations in the computation, and combining the results back to the large-word result. In one aspect, a "word" may be a w-bit string that may be represented as a sequence of hex digits.

Hence, as described herein, the current disclosure provides a novel way to integrate a special purpose hardware execution unit ("SPU") that operates on large words of length l with the RISC processor (e.g., a CPU) that operates on words of fixed width w, with w being smaller or less than l. For performance reasons, the present disclosure provides for separate copies of the state shared by the CPU and the SPU. This further necessitates the need for a mechanism to ensure that the accesses from the CPU and the SPU go to the correct copy (e.g., a most recent or latest version) of the shared state, and furthermore, the location of the latest copy is automatically chosen to optimize accesses to the shared state. Finally, a mechanism must be provided for exceptions and interrupts to automatically back up the correct state, and that program works correctly after return from exception/interrupt, since the correct state is restored in the CPU.

In one implementation, in response to receiving one or more control signals from a central processing unit ("CPU"), a set of operations are executed on a state of a special purpose execution unit ("SPU") having a plurality of registers, the SPU being associated with the CPU and the state of the SPU having word widths of one or more of the plurality of registers being greater in size than word widths of a plurality of CPU registers of a computing system and a set of state-master bits to synchronize the state of the SPU and a state of the CPU. The results of the set of operations are stored in the plurality of registers or an alternative set of registers.

In an additional implementation, the present disclosure provides for the integration of a special purpose hardware unit ("SPU) in a central processing unit ("CPU") such as, for example, a RISC processor. The SPU has state that may be comprised of: 1) one or more large-word registers which state overlaps with (i.e., overlaid on) multiple registers of the CPU, and 2) a set of state-master bits to synchronize the CPU and SPU states, one bit for each addressable large-word registers in SPU. It should be noted that the set of CPU registers with overlaid SPU registers may be referred to as a "shared state". The SPU may view the state as different number of registers of different and varying sizes than the CPU.

The SPU and the CPU treat this state as differently sized and different number of registers. The SPU can perform a set of operations on its state in response to receiving the control signals from CPU (analogous to other functional units of the CPU).

A set of move internal operations ("IOPS") supported in the CPU, along with state master bits, may transfer/move data between one of the SPU registers and its corresponding shared state of the CPU. In one aspect, the transfer may include 1) automatically copying, transferring, or moving data between one of the SPU registers and its corresponding shared state of the CPU when the most recent or latest data is not local to the accessing unit (e.g., the SPU or the CPU), avoiding explicit data transfer instructions to transfer data between the two units, and 2) transparently handle saving of shared state from the more recent of the CPU or SPU copies, as determined by state-master-bits, on exceptions and interrupts.

In some implementation, the present invention may apply to the acceleration of, elliptic curve cryptograph ("ECC"), for example, and other cryptographic algorithms that work on wide words. It should be noted that as used herein, any reference to the use of the SHA-3 is provided for illustration and example purposes only and other cryptography hash algorithms (e.g., SHA-2) may be used.

Also, in general, as used herein, "optimize" may refer to and/or defined as "maximize," "minimize," "best," or attain one or more specific targets, objectives, goals, or intentions. Optimize may also refer to maximizing a benefit to a user (e.g., maximize a trained machine learning pipeline/model benefit). Optimize may also refer to making the most effective or functional use of a situation, opportunity, or resource.

Additionally, optimizing need not refer to a best solution or result but may refer to a solution or result that "is good enough" for a particular application, for example. In some implementations, an objective is to suggest a "best" combination of operations and/or machine learning models/machine learning pipelines, but there may be a variety of factors that may result in alternate suggestion of a combination of operations and/or machine learning models yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
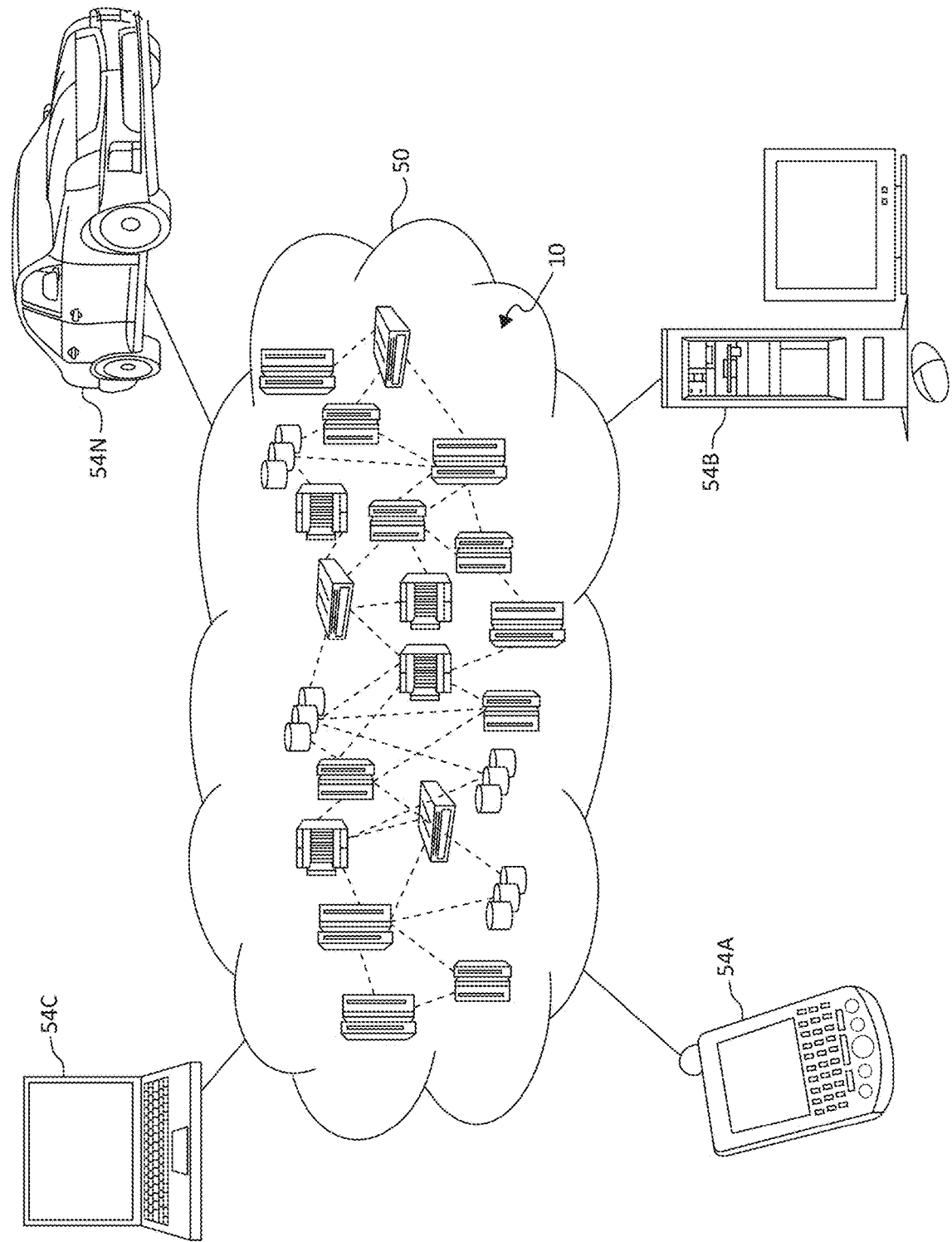
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
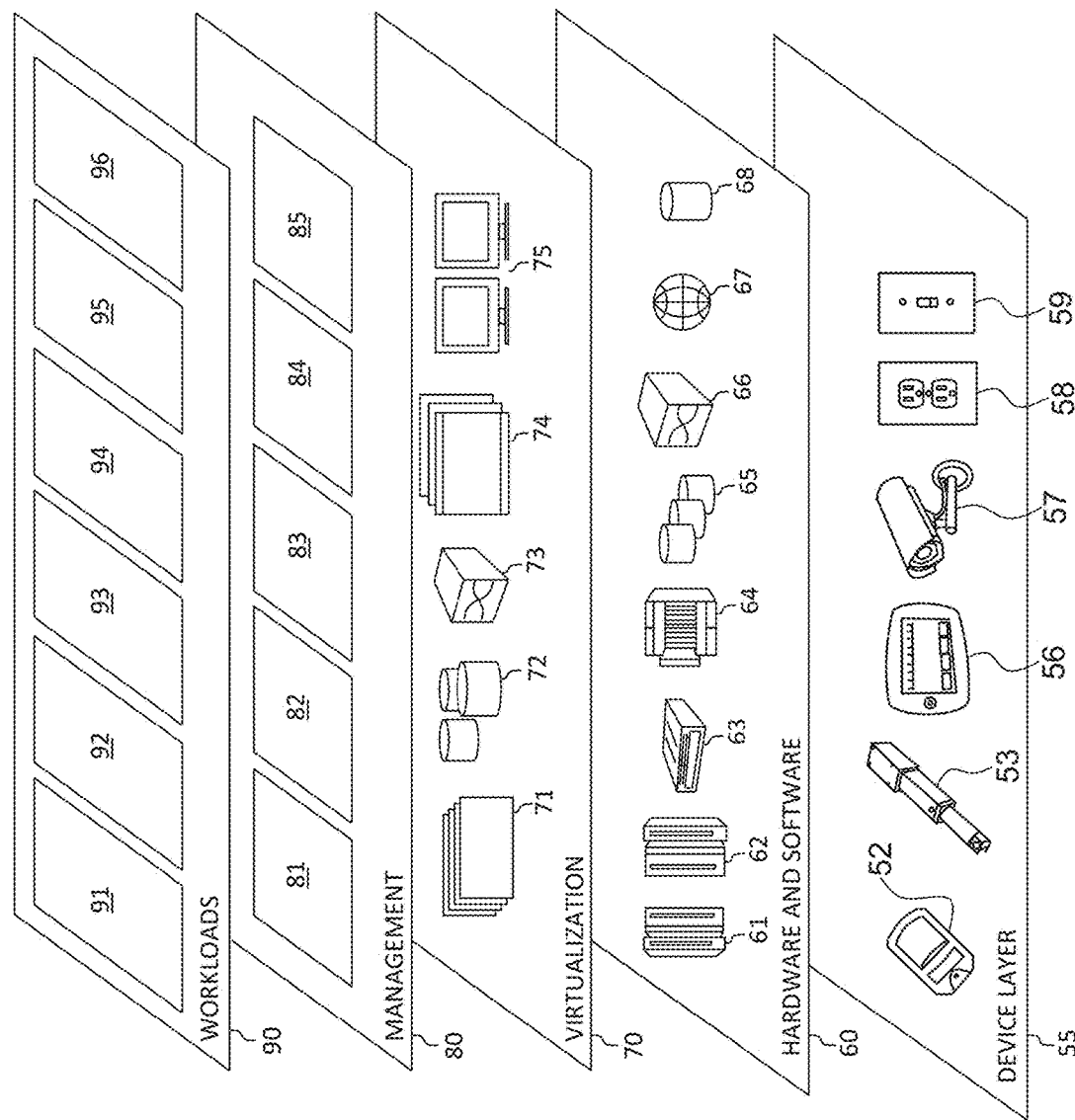
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for supporting large-word operations in a Reduced Instruction Set Computer ("RISC") in a computing environment. In addition, workloads and functions 96 for supporting large-word operations in a Reduced Instruction Set Computer ("RISC") in a computing environment may include such operations as analytics, deep learning, and as will be further described, user and device management functions. One of ordinary skill in the art will appreciate that the workloads and functions 96 for supporting large-word operations in a Reduced Instruction Set Computer ("RISC") in a computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously stated, the present invention provides novel solutions for supporting large-word operations in a Reduced Instruction Set Computer ("RISC") in a computing environment by one or more processors in a computing system. In one implementation, in response to receiving one or more control signals from a central processing unit ("CPU"), a set of operations are executed on a state of a special purpose execution unit ("SPU") having a plurality of registers, the SPU being associated with the CPU and the state of the SPU having word widths of one or more of the plurality of registers being greater in size than word widths of a plurality of CPU registers of a computing system and a set of state-master bits to synchronize the state of the SPU and a state of the CPU. The results of the set of operations are stored in the plurality of registers or an alternative set of registers.

In an additional implementation, a processor in a computer system may be provided with additional hardware such as, for example, an SPU dedicated for performing a complex operation on a state that is aggregation of designated multiple registers of the processor's register file. Results may be stored back into the same or different set of designated multiple registers. The SPU comprises of one or more state registers, the word widths of one or more of these registers being larger than the word width of the registers in the CPU. A set of compute instructions are executed within the SPU, which only manipulate the state of the SPU. A set of move IOPs copy state from the processor's register file to one or more of the registers in the SPU, and conversely from one or more of the registers in the SPU to the multiple registers in the processor's register file.

A complete copy of the dedicated SPU state is maintained for each hardware thread supported by the processor. Hardware multithreading is supported by replicating the state in the dedicated hardware (e.g., the SPU) for each hardware thread and pipelining the compute instructions, issued by the different hardware threads. The dedicated hardware (e.g., the SPU) implements an instruction to perform one round of the state-permute function of SHA-3. Alternatively, the dedicated hardware (e.g., the SPU) implements an instruction to perform all 24 rounds of the state-permute function of SHA-3. The move IOPs move the contents of one of the processor's registers to a specified section of the dedicated hardware's (e.g., the SPU) state, or moves the contents of a specified section of the dedicated hardware's state to one of the processor's registers.

Figure 4:
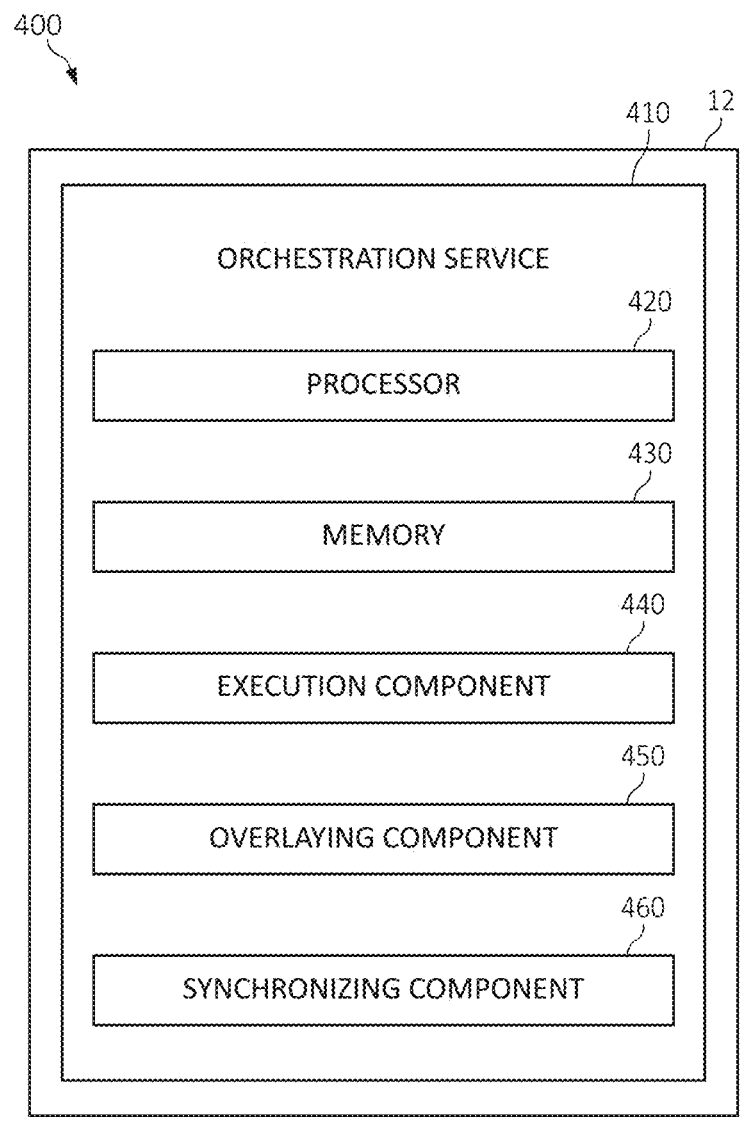
FIG. 4 is an additional block diagram depicting an exemplary functional relationship between various aspects of the present invention.

Turning now to FIG. 4, a block diagram depicting exemplary functional components of system 400 for integrating and improving performance of disaggregated memory in a computing environment according to various mechanisms of the illustrated embodiments is shown. In one aspect, one or more of the components, modules, services, applications, and/or functions described in FIGS. 1-3 may be used in FIG. 4. As will be seen, many of the functional blocks may also be considered "modules" or "components" of functionality, in the same descriptive sense as has been previously described in FIGS. 1-3.

A special purpose hardware unit service 410 is shown, incorporating arithmetic logic unit ("ALU") 420 ("processor") (e.g., a SPU) to perform various computational, data processing and other functionality in accordance with various aspects of the present invention. In one aspect, the processor 420 and registers 430 may be internal and/or external to the special purpose hardware unit service 410, and internal and/or external to the computing system/server 12. The special purpose hardware unit service 410 may be included and/or external to the computer system/server 12, as described in FIG. 1. The processing unit 420 may be in communication with the registers 430. The special purpose hardware unit service 410 may include an execution component 440, an overlaying component 450, and a synchronizing component 460.

In one aspect, the system 400 may provide virtualized computing services (i.e., virtualized computing, virtualized storage, virtualized networking, etc.). More specifically, the system 400 may provide virtualized computing, virtualized storage, virtualized networking and other virtualized services that are executing on a hardware substrate.

The special purpose hardware unit service 410, using the execution component 440, the overlaying component 450, and the synchronizing component 460, may, in response to receiving one or more control signals from a central processing unit ("CPU"), execute a set of operations on a state of a special purpose execution unit ("SPU") having a plurality of registers 430, the SPU being associated with the CPU and the state of the SPU having word widths of one or more of the plurality of registers 430 being greater in size than word widths of a plurality of CPU registers of a computing system and a set of state-master bits to synchronize the state of the SPU and a state of the CPU. The special purpose hardware unit service 410 may store results of the set of operations in the plurality of registers 430 or an alternative set of registers (not shown for illustrative convenience).

The overlaying component 450 may overlay the state of a plurality of registers of the SPU with the plurality of CPU registers in the CPU. The synchronizing component 460 may copy the state of the plurality of CPU registers to the plurality of registers of the SPU using a set of move internal operations ("IOPS").

The synchronizing component 460 may replicate the state of the SPU for each of a plurality of threads of the SPU and pipeline compute instructions issued by each of the plurality of threads of the SPU.

In one implementation, the execution component 440 may execute, for the SPU, instructions to perform a round of a state-permute functions of secure hash algorithm-3 ("SHA-3") where the state of the SPU is a width of a first register with at least an n number of bits and a second register with an m number of bits, wherein n and m are positive integers.

In an additional implementation, the execution component 440 may execute, for the SPU, instructions to perform a plurality of rounds of a state-permute functions of secure hash algorithm-3 ("SHA-3").

Figure 5:
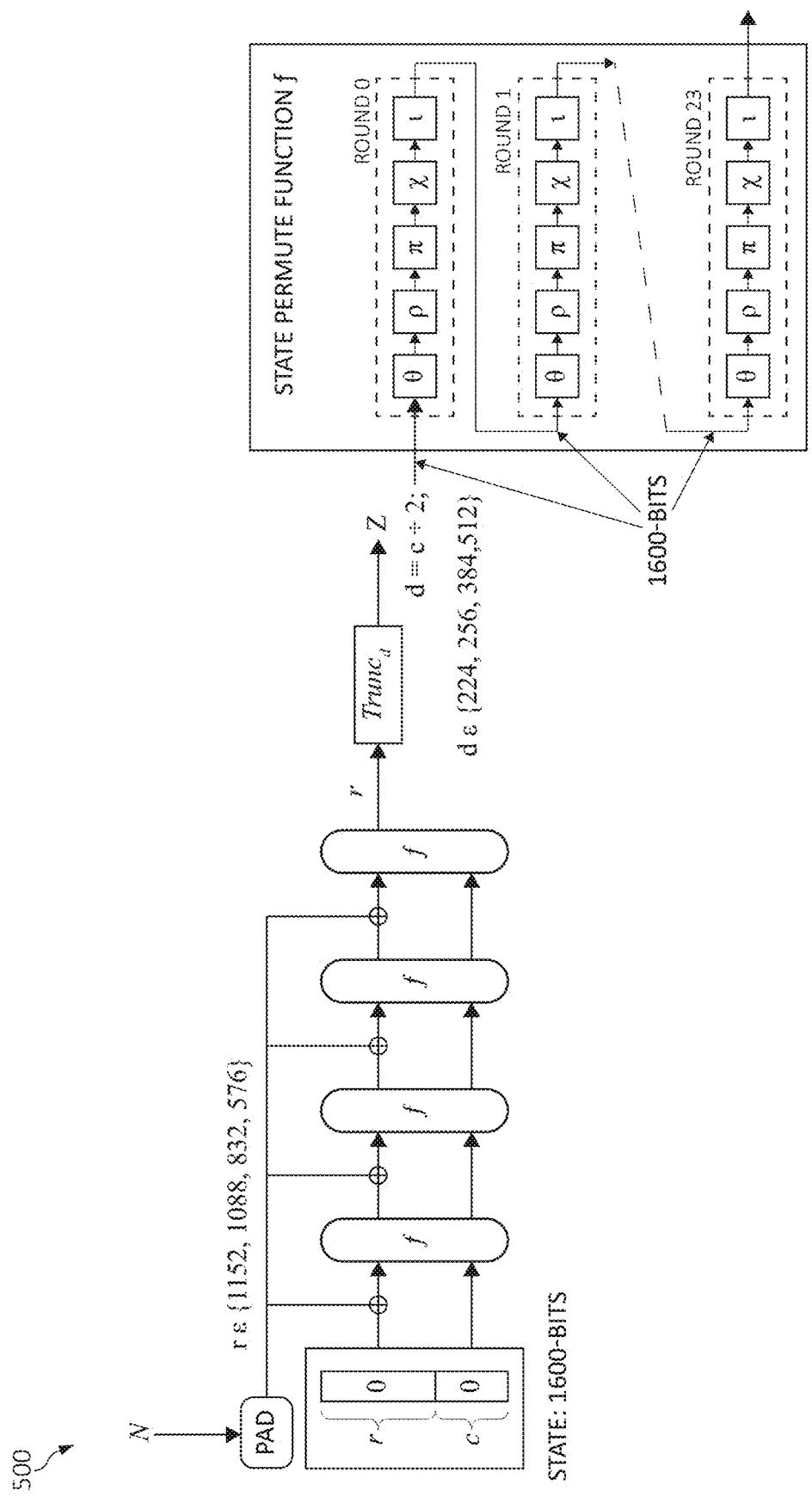
FIG. 5 depicts block flow diagram depicting operations for state-permute functions in secure hash algorithm-3 ("SHA-3") for large word operations in a computing environment according to an embodiment of the present invention.

For further explanation, FIG. 5 is a block diagram depicts exemplary operations for state-permute functions in secure hash algorithm-3 ("SHA-3") for large word operations in a computing environment. In one aspect, one or more of the components, modules, services, applications, and/or functions described in FIGS. 1-4 may be used in FIG. 5. As shown, various blocks of functionality are depicted with arrows designating the blocks' of system 500 relationships with each other and to show process flow (e.g., steps or operations). Additionally, descriptive information is also seen relating each of the functional blocks' of system 500.

As will be seen, many of the functional blocks may also be considered "modules" of functionality, in the same descriptive sense as has been previously described in FIGS. 1-4. Repetitive description of like elements employed in other embodiments described herein is omitted for sake of brevity.

With the foregoing in mind, the module blocks' of systems 500 may also be incorporated into various hardware and software components of a system integrating disaggregated memory in a cloud computing environment in accordance with the present invention. Many of the functional blocks of systems 500 may execute as background processes on various components, either in distributed computing components, or elsewhere.

As a preliminary matter, input data ("N") is provided as input data to a SHA-3 function and the message (e.g., the input) being hashed is divided into r bit blocks, where r∈{1152, 1088, 832, 576}. Second, a state S of the SHA-3 is 1600 bits. That is, the state S=r||c, is a vector of 1600 bits and may be initialized to $0=S_0$. Third, the state permute function (e.g., f:s→s) is 24 rounds, each round a composition of five functions. In other words, the state permute function f is $f(s)=(\iota \circ \chi \circ \pi \circ \rho \circ \theta)^{24}(s)$, and each round (e.g., round 0, . . . , round 23) maps 1600 bits to 1600 bits. That is, the 24 rounds are represented as $(\iota \circ \chi \circ \pi \circ \rho \circ \theta)^{24}$, or 24 $(\iota \circ \chi \circ \pi \circ \rho \circ \theta)$ rounds. Hereafter, the function $(\iota \circ \chi \circ \pi \circ \rho \circ \theta)$ may be referred to as a round. The variables $\iota, \chi, \pi, \rho$, and $\theta$ are five step mappings that comprise a round.

The message is padded with the pattern 10*1 in its padding function ("pad"): a 1 bit, followed by zero or more 0 bits (maximum r−1) and a final 1 bit., to make the message an exact integer multiple of r. The variable d is an input parameter to the truncation (trunc) algorithm. The truncation algorithm is used to truncate the output, Z, obtained after multiple rounds of squeeze operations to the message digest size of d bits. d is equal to 224, 256, 384 or 512 depending on the algorithm SHA3-224, SHA3-256, SHA3-384 or SHA3-512, respectively.

The SHA-3 algorithm may include performing $S_{i+1}=f(S_i \oplus P_i)$, on the r bit blocks, where ⊕ is a bitwise XOR ("exclusive-OR") operation. Also, the SHA-3 algorithm may also extract r bits of the hash at a time from the state S, performing S←f(S) operation between two such extractions.

Figure 6:
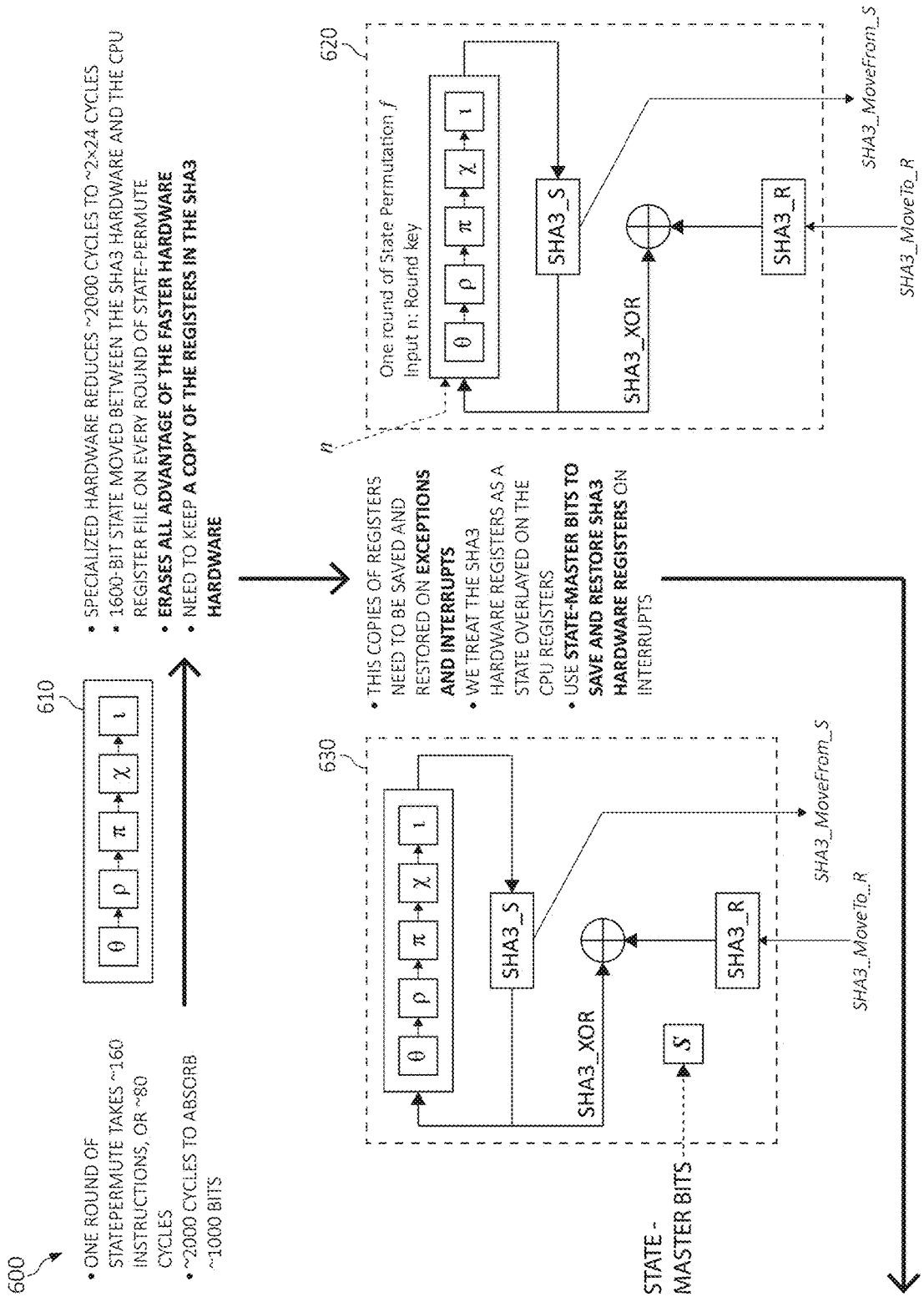
FIG. 6 depicts an additional block flow diagram depicting operations for copying a wide-word of a secure hash algorithm-3 ("SHA-3") state and ensuring coherence with a register file in a computing environment according to an embodiment of the present invention.

For further explanation, FIG. 6 depicts an additional block flow diagram depicting operations for copying a wide-word of a secure hash algorithm-3 ("SHA-3") state and ensuring coherence with a register file in a computing environment. In one aspect, one or more of the components, modules, services, applications, and/or functions described in FIGS. 1-5 may be used in FIG. 6. Repetitive description of like elements employed in other embodiments described herein is omitted for sake of brevity.

In one aspect, the SHA3 function may consume or take approximately 160 instructions on a CPU for each of the 24 $(\iota \circ \chi \circ \pi \circ \rho \circ \theta)$ rounds 610 of the state permute function f, which takes approximately 80 clock cycles. Thus, the present invention reduces the time taken to one or two cycles per $(\iota \circ \chi \circ \pi \circ \rho \circ \theta)$ round 610 of the state permute function f. The SPU reduces approximately 2000 cycles to approximately 2×24 cycles. The 1600-bit state may be transferred or moved between the SHA-3 registers (e.g., SHA3_S and SHA3_R) and the CPU registers on every round (e.g., every $(\iota \circ \chi \circ \pi \circ \rho \circ \theta)$ round) of the state permute function f, but this erases all advantages of the faster hardware. Thus, there is a need to keep a copy of the registers in the SHA3 hardware.

A copy of the registers such as, for example, SHA3_S and SHA3_R may be retained in the SHA-3 SPU, as depicted in blocks 620 and 630. This necessitates that copies of registers are saved and restored on exceptions and interrupt. The SHA-3 SPU registers such as, for example, SHA3_S and SHA3_R may be considered as a state overlayed on the CPU registers. One or more state-master bits ("S") maybe used to save and restore SHA-3 SPU registers on interrupts.

Figure 7A:
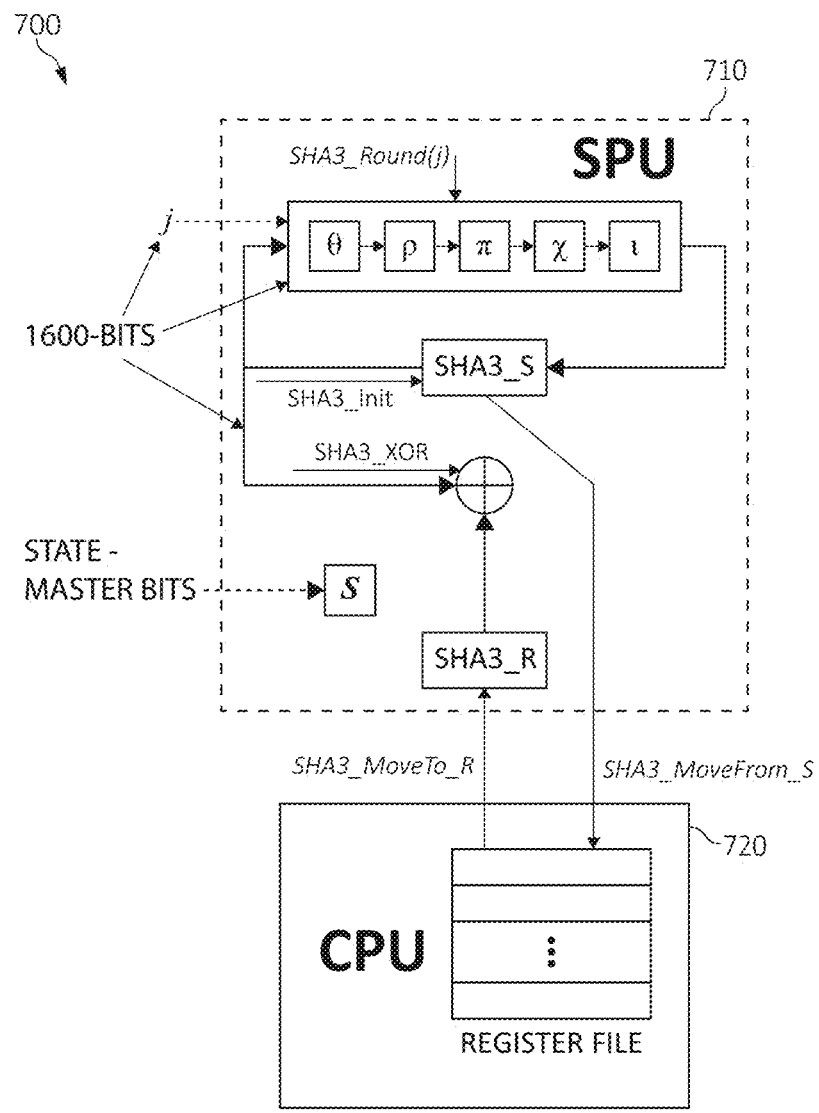
FIG. 7A depicts an additional block flow diagram depicting operations for using a special purpose execution unit ("SPU") for large-word operations in a computing environment according to an embodiment of the present invention.

For further explanation, FIG. 7A depicts an additional block flow diagram depicting operations for using a special purpose execution unit ("SPU") for large-word operations in a computing environment. In one aspect, one or more of the components, modules, services, applications, and/or functions described in FIGS. 1-6 may be used in FIG. 7A. Repetitive description of like elements employed in other embodiments described herein is omitted for sake of brevity.

FIG. 7A depicts an SPU 710 having SHA-3 SPU registers such as, for example, SHA3_S and SHA3_R. The SPU 710 is in communication with a CPU 720. The CPU may include a register file.

In one aspect, the state permute function f may perform each of the operations $(\iota \circ \chi \circ \pi \circ \rho \circ \theta)$, which are a composition of five operations. The SPU 710 (e.g., SHA-3 SPU) includes the two registers SHA3_S and SHA3_R having 1600 bits and 1152 bits wide, respectively. The SPU 710 can execute each of the following instructions: 1) a SHA3_Round (e.g., one round of the state permute function f, with the input being a round key, 2) a SHA3_XOR, and 3) a SHA_3_init (sets SHA3_S to 0).

In an additional aspect, each of the microoperations may be performed to effect data movement between the CPU 720 and the SPU 710 such as, for example: 1) a "SHA3_MoveTo_R" operation moves data from multiple CPU registers to the SHA3_R register in the SPU 710, and/or 2) a "SHA3_MoveFrom_S" operation moves data from the SHA3_S register in the SPU 710 to multiple CPU registers.

The SPU data paths, 1600-bits, are wider than the CPU data paths (e.g., typically 64-bits). The SHA3_S and SHA3_R registers of the SPU 710 may be overlayed on the general-purpose registers ("GPRs") in the CPU 720. The microoperations to move data between the CPU 720 and the SPU 710 are invoked as part of the CPU/SPU instructions that access data. State-master bits may facilitate protocols to enforce access to latest copy of the overlayed registers. A coherence capability may be used to manage and save the SPU state (e.g., state of the SPU 710), when necessary, on exceptions and interrupts. That is, the most recent value of the state is saved. The state-master bits indicate whether the most recent value is in CPU or SPU. The SHA3_Round instruction can be defined to carry all 24 ($\iota \circ \chi \circ \pi \circ \rho \circ \theta$) rounds of state permute function f, instead of one round of f, obviating the need for calling the instruction 24 times in a program. That is, if the SHA3_round instruction does one round, it has to be called 24 times. A new instruction "SHA3_round24" may be defined that does the work of SHA3_round 24 times over. Thus, 24 SHA3_rounds are replaced by one SHA3_round24.

Thus, the state of the SPU 710 may be overlapped with (i.e., overlaid on) multiple registers of the CPU. A set of compute instructions decoded by the CPU 720 may be provided to generate control signals for the SPU 710 to operate on the SPU's 710 current state to produce its (SPU's 710) next state.

In an additional aspect, a set of internal operations ("IOPS") may be implemented in the CPU 720 to move data between the shared state of the CPU 720 and one of the SPU 710 registers such as, for example, SHA3_S and SHA3_R. The state-master bits are provided for each large-word register (e.g., the SHA3_S and SHA3_R) of the SPU state. The state-master bits may follow one or more protocols to enforce accesses to the correct state by the move IOPS.

In one implementation, the one or more protocols to enforce accesses to the correct state by the move IOPS may be as follows. First, all large-word register (e.g., the SHA3_S and SHA3_R) of the SPU state may be set to 0 at start up. In one aspect, the SHA3_Init instruction sets all state-master bits to 1. The zero value of the SPU is the most recent value for the overlayed CPU and SPU registers.

If the CPU 720 accesses a shared-state register (e.g., one of the large-word register such as, for example, the SHA3_S and SHA3_R) for reading or writing, when the shared-state register's state-master bit is one, the SPU state of the SPU 710 may be copied back into the shared-state before accessing the shared state register. If the access is for writing, the state-master bit for that register may be reset to zero.

If the SPU accesses one of its registers (e.g., the SHA3_S or SHA3_R) for reading or writing, when the SPU's 710 state-master bit for that register is zero, the shared-state for that register is copied from the CPU to the SPU before accessing the register. If the access is for writing, the state-master bit is set to one before the access is performed. The Init instruction may be used after a computation, involving the SPU 710, completes and the state of the SPU 710 no longer needs to be preserved. The Init instruction is used to set state master bits to 1 before starting execution.

In an additional implementation, the SPU 710 for SHA3 instructions may be implemented. In one aspect, the SPU 710 may be added to the CPU 720 such as, for example, a RISC processor core for speeding up SHA3 computation. The SPU 710 includes the two long word registers SHA3_S and SHA3_R. For example, the SHA3_S is 1664 bits (it needs to be only 1600 bits, but it may be a multiple of 128 bits to facilitate transfer to/from registers of the CPU (e.g., vector registers "VSRs"). The SHA3_R is 1152 bits wide, depending on the rate, only a subset of these bits will be used. The SPU 710 may manipulate the SHA3_S and SHA3_R state by the following three compute instructions. A first compute instruction may be a SHA3_Round(j) instruction that performs function f, ($\iota \circ \chi \circ \pi \circ \rho \circ \theta$), on SHA3_S{0:1599}. A second compute instruction may be a SHA3_XOR instruction that performs XOR of SHA3_S{0:1151} and SHA3 R{0:1151}. A third compute instruction may be a SHA3_Init instruction that initializes s SHA3_S{0:1663} and SHA3_R{0:1151} to 0 and sets their state-master bits to 1.

Moreover, the SPU 710 may be integrated to the CPU 720 (e.g., a processor core). In one implementation, multiple IOPS such as, for example, four IOPS, may be defined to move data from the CPU 720 to the registers SHA3_S and SHA3_R of the SPU 710 and back from SPU 710 to the CPU 720. For example, given that two SPU long-word registers are 1664 bits (SHA3_S) and 1152 bits (SHA3_R) wide, there may be multiple CPU registers such as, for example, 22 VSR registers (each 128 bits) as a source or a destination in the CPU 720. It should be noted that that instruction SHA3_MoveTo_R and SHA3_MoveFrom_R have been parameterized to support multiple SHA3 rates. SHA3_R transfers may be 576, 832, 1088, or 1152 bits, corresponding to 5, 7 or 9 vector registers (VSR) in the CPU 720. Depending on the size and number of registers of the SPU 710, an alternate source, for example, one or more general-purpose registers may be selected.

Figure 9:
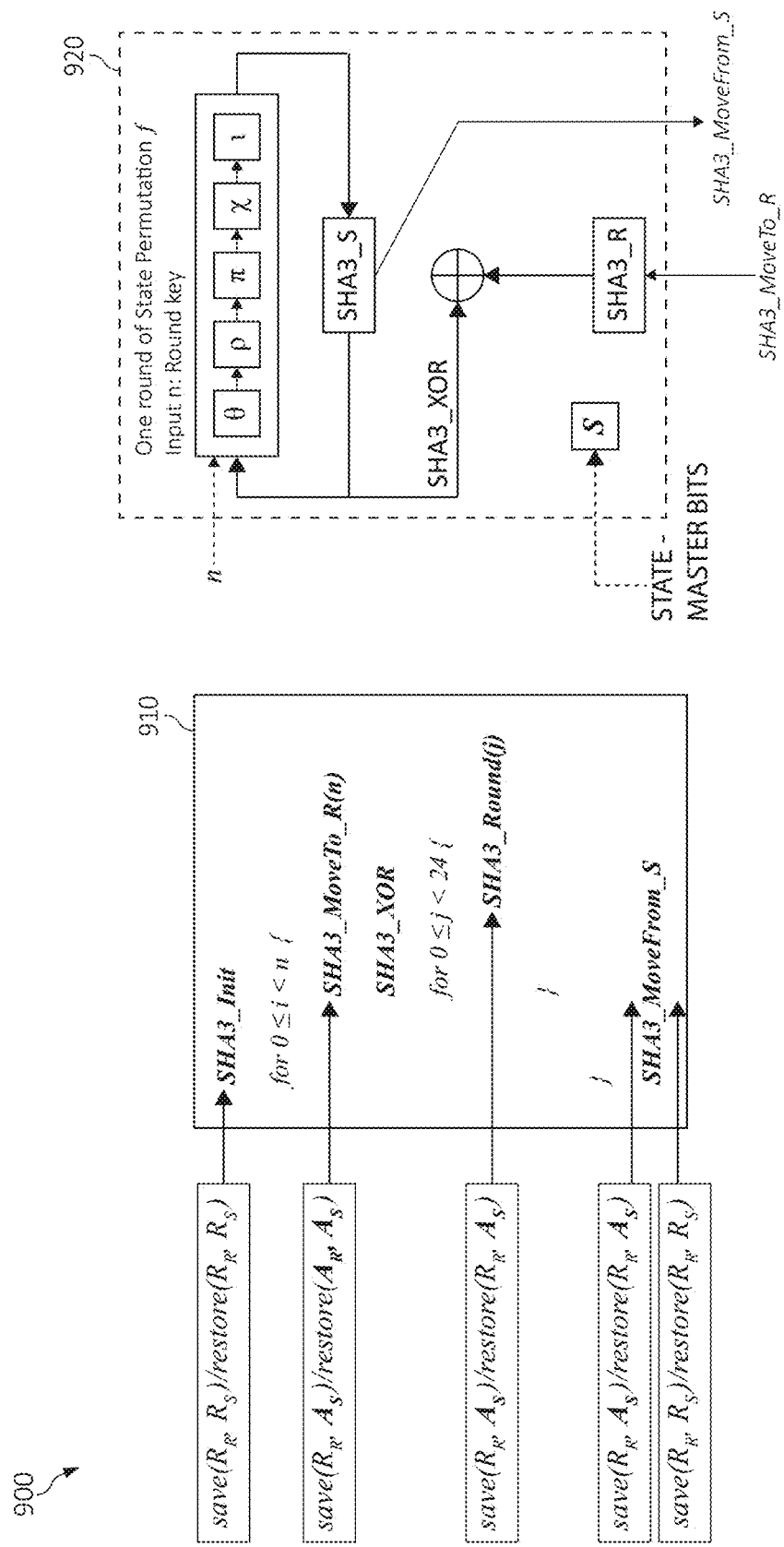
FIG. 9 depicts an additional block flow diagram depicting operations for handling exceptions using the state-master bits in a computing environment according to an embodiment of the present invention.

For computation of the SHA-3 using the SPU 710, the algorithm for computing the hash of a message M using the SPU instructions and the SHA3_Move IOPS defined above (e.g., the SHA3_MoveTo_R, SHA3_MoveFrom_R, SHA3_MoveTo_S and SHA3_MoveFrom_S) as shown in FIG. 9. For brevity, only the instructions and IOPS received by the SPU 710 are shown.

It should be noted that instructions are executed by the CPU 720 to pad the message M and stage its blocks $P_0, P_1, \ldots, P_{n-1}$ to the SPU 710 shared state, as shown in FIG. 7A. The main steps of this computation are as follows. In step (1), the host CPU 720 pads a message M to make the length a multiple of r, the rate chosen for SHA3. Logically the message is now n blocks of r bits each. In step (2), the first instruction received by the SPU 710 is the SHA3_Init instruction. In step (3), the for loop on the i processes the n blocks of the padded message one block at a time, each iteration is two steps. In step (4), the hash is read back.

In step 3a), the SHA3_XOR instruction is executed by the SPU to xor the $P_i$ block with the state in SHA3_S. (Since SPU 710 will not be writing this register, the state-master bit for the SHA3_R register stays 0, and SPU 710 receives a copy via SHA3_MoveTo_R IOP executed as part of SHA3_XOR instructions. Since SHA3_S is being modified by the SPU, when i=0, the state-master bit will transition to 1, and will stay 1 until the last SHA3_init is executed. In step 3b), twenty-four rounds of SHA3_Round(j) are performed on SHA3_S to carry out state-permute. The SHA3_MoveFrom_S IOP is executed along with the read operation by the CPU 720 to read the HASH from the shared state. The usage of the SPU 710 for performing the hash ends with the final SHA3_Init instruction, which will reset all state-master bits.

The combination of state-master bits and IOPs are sufficient to handle exceptions and interrupts. A state-master bit indicates whether its associated CPU state (shared-state) or SPU state is valid (has the latest or most recent value). For example, the SHA3_S and SHA3_R registers are the SPU state of the SPU 710. In the event of an exception/interrupt, the operating system needs to only save the VSRs of the CPU 720, if the correct state is in the SPU 710, it will be automatically pulled back into the CPU 720. Similarly, when returning from exception/interrupt, the operating system only needs to restore the VSRs of the CPU 720. If the correct state was in the SPU 710, the operating system upon return from exception will continue to read the correct value from the CPU 720 and it will get transferred to the SPU 710 when the SPU 710 performs a read or write operation (e.g., writes). On returning from interrupt, the state-master bits must be set to 0.

It should be noted that the SHA3_R register and SHA3_XOR instructions allow computation to proceed without having to move data out of the state register (SHA3_S) between applications of the state permute function $f$. The CPU 720 and the SPU 710 are working in tandem. In an absorb phase, while the CPU 720 is fetching up to 9 vector registers in its shared-state, the SPU 710 is performing the 24 SHA3 rounds (e.g., the 24 ($\iota \circ \chi \circ \pi \circ \rho \circ \theta$) rounds). Data to be absorbed is first loaded into VSR[48:56] (for e.g., fewer registers if data is less than the maximum of 1152 bits) and then moved to SHA3_R register before processing.

An alternate implementation of the state transitions may be as follows. If the CPU 720 accesses a shared-state register when its state-master bit is one, for reading or writing, the SPU 710 state is copied back into the shared-state and state-master bit for that register is reset to zero before the access is performed. If the SPU 710 accesses one of its registers when its state-master bit is zero, for reading or writing, by an instruction other than SHA3_init, the shared-state for that register is copied from the CPU 720 to the SPU and the state-master bit is set to one before the access is performed.

In an additional implementation, one or more responsibilities of handling exceptions may be provided to the application binary interface ("ABI"). That is, exception handling routines may be responsible for saving the SPU state of the SPU 710. In one aspect, the IOPS, to move data between the SPU 710 and the CPU 720, become architected instructions for use by the exception handlers; and there is no need for the state-master bits as the SPU 710 and CPU 720 states are being individually saved and restored.

Figure 7B:
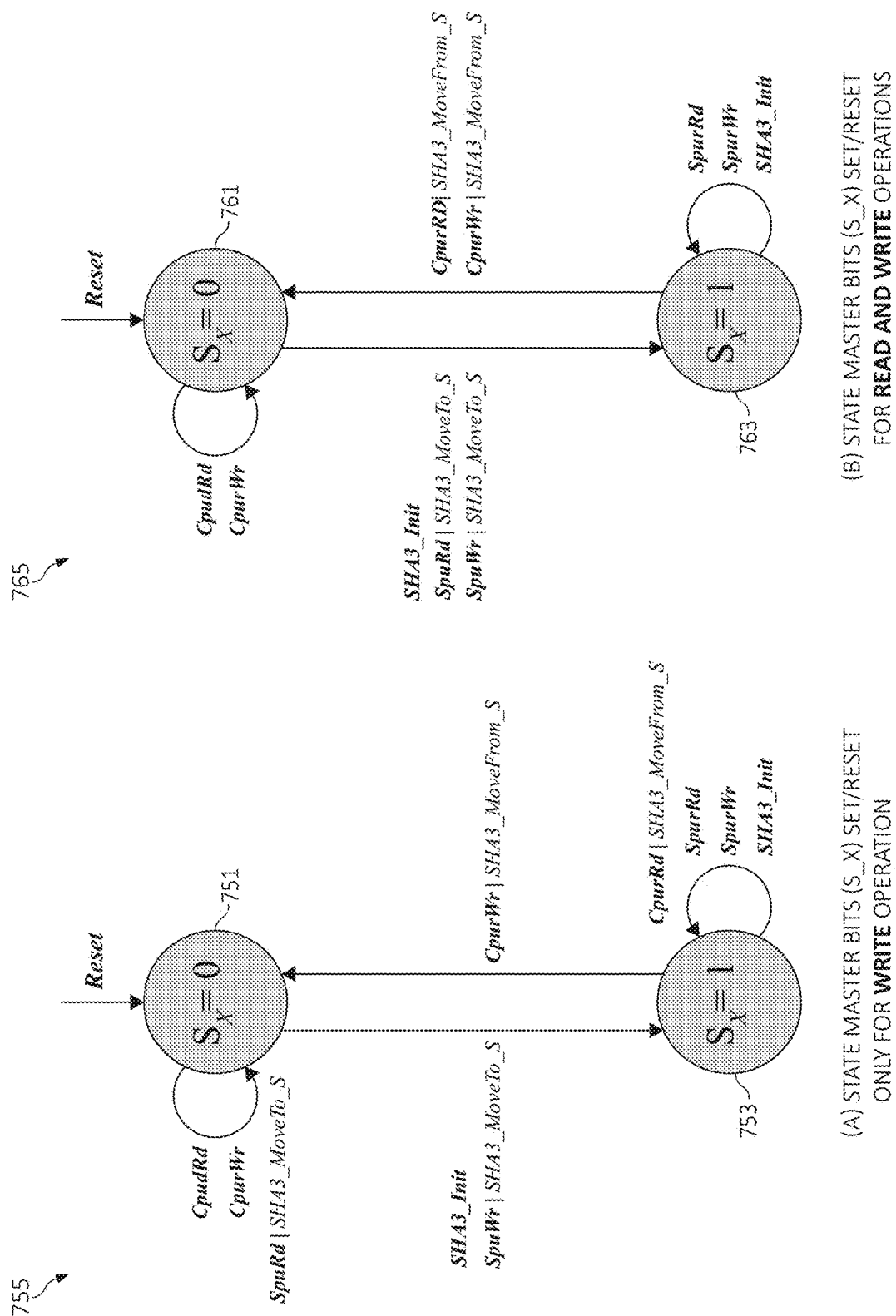
FIG. 7B depicts a state diagram depicting two exemplary coherence protocols for coherence between CPU registers and alternate SPU registers in a computing environment according to an embodiment of the present invention.

Turning now to FIG. 7B, is a state diagram depicting two exemplary coherence protocols for coherence between CPU registers and alternate SPU registers. A first coherence protocol 755 and a second coherence protocol 765 is depicted with each with a first state 751, 761 and a second state 753, 763, respectively. The first coherence protocol 755 is for setting and resetting the state-master bits for only write operations. The second coherence protocol 765 is for setting and resetting the state-master bits ($S_x$) for both read and write operations. The operations for handling the state-master bits is $S_x=\{S_R, S_s\}$.

Coherence is achieved using State master bits $S_x$, one for each SPU register. For example, $S_s$ is a state-master bit associated with SHA3_S register and $S_R$ is a state-master bit associated with the SHA3_R register. The state master bits indicate whether the CPU or the SPU has the latest copy of the data based on whether the state-master bit is 0/1, respectively.

As depicted for the first coherence protocol 755 (e.g., one coherence protocol option), upon reset of system, the state-master bit $S_x$ is set to 0 (e.g., state 751), indicating that the CPU register has the latest data. A CPU read/write (e.g. $C_{pu}Rd/C_{pu}Wr$) or a SPU read (SpuRd) of the register does not change the state-master bit $S_x$, and data is obtained from the CPU registers. Upon initialization (e.g., SHA3_Init) or an SPU write (SpuWr) to the register, the state-master bit is set to 1, indicating that the SPU register has the latest data. A SPU read/write and/or a CPU read and Init when $S_x$ is 1 does not change the state-master bit from the 1 state (e.g., state 753). If a CPU write is performed, the state-master bit is set to 0 (e.g., state 753 moves back to state 751).

As depicted for the first coherence protocol 765 (e.g., an alternative coherence protocol option), the state-master bit $S_x$ may be set to 1 (e.g., state 763) for both SPU reads and writes to registers. The state-master bit $S_x$ is set to 0 (e.g., state 761), for both CPU reads and writes to registers. Thus, for both read or write operations, the latest copy of the data is moved to the accessing unit and the state-master-bit indicates that the corresponding register (CPU/SPU) holds the latest copy of the data. This alternate coherence protocol may be advantageous for different access patterns jointly by the CPU and SPU. In both figures, the text in green indicates CPU internal operations when the SPU implements SHA3.

Figure 8:
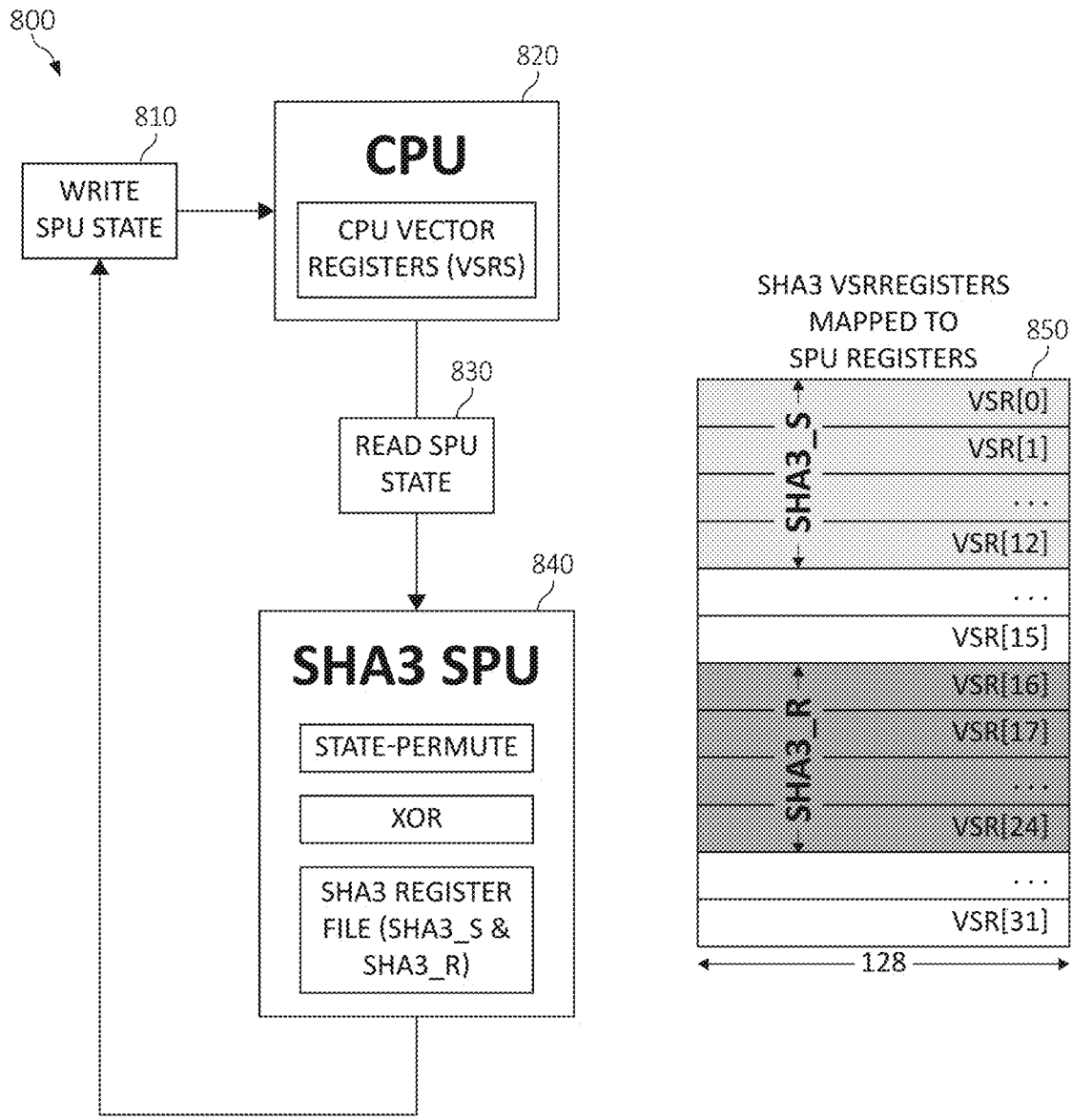
FIG. 8 depicts an additional block flow diagram depicting operations for overlaying secure hash algorithm-3 ("SHA-3") registers on central processor unit ("CPU") registers in a computing environment according to an embodiment of the present invention.

For further explanation, FIG. 8 is an additional block flow diagram depicting overlaying special purpose execution unit ("SPU") registers on central processor unit ("CPU") registers in a computing environment. In one aspect, one or more of the components, modules, services, applications, and/or functions described in FIGS. 1-7 may be used in FIG. 8. Repetitive description of like elements employed in other embodiments described herein is omitted for sake of brevity.

As depicted in FIG. 8, the SPU's registers such as, for example, the SHA3_S and SHA3_R registers 850 may be in communication with the CPU 820, having one or more CPU vector registers ("VSRs"). The state may be presented differently to the SPU 840 and the SPU 840 can use the new (wider representation) advantageously to get higher performance. The SPU registers such as, for example, SHA3_S and SHA3_R registers may refer to the same set of bits such as, for example, VSR[0], VSR[1], . . . , VSR[12], and VSR[15], VSR[16], VSR[17], . . . , VSR[24], . . . , and VSR[31], in the CPU 820.

Registers VSR[0] through VSR[12] of CPU 820 and VSR[16] through VSR[24] of the CPU 820 are designated as SHA3 VSR registers, as illustrated in it block 850 of FIG. 8. The SHA3 VSR registers of the CPU 820 are mapped to the SHA3_S and SHA3_R registers of the SPU 840, as depicted in block 850. The CPU 820 may read the SPU state of the SPU 840, as in block 830. The SPU 840 may write the state of the SPU 840 to the CPU 820. Thus, the CPU 820 and the SPU 840 (e.g., the SHA-3 SPU) may keep separate copies of these bits and the copies being synchronized on access.

For further explanation, FIG. 9 depicts an additional block flow diagram depicting operations for handling exceptions using the state-master bits in a computing environment. In one aspect, one or more of the components, modules, services, applications, and/or functions described in FIGS. 1-8 may be used in FIG. 9. Repetitive description of like elements employed in other embodiments described herein is omitted for sake of brevity.

As depicted, the state-master bits ("S") indicates whether an accelerator state such as, for example, the state of the SPU differs from the CPU register file, i.e., which state is valid. The state-master bits ("S") are set and reset by the protocols shown in FIG. 11. It should be noted that there may be two state-master-bits; one state-master-bit for SHA3_S and another state-master-bit for SHA3_R. Also, the state-master bit follows the rules that: 1) the bit indicates who has the valid copy of the state or which state is to be used, i.e. whether the CPU state or the SPU state is guaranteed to be current, and 2) the bit is updated when a write happens to that state.

It should be noted that exceptions and interrupts are unexpected events that disrupt the normal flow of instruction execution. An exception is an unexpected event from within the processor. An interrupt is an unexpected event from outside the processor. On an exception, if a bit of the state-master bits ("S") is set, corresponding SHA3_S and SHA3_R registers of the SPU may be saved instead of the corresponding registers in a register file of a the GPU register file. The corresponding state-master bits ("S") are reset. If the state-master bits ("S") are not set, SHA3_XOR and SHA3_Round instructions may be split into two or three IOPS, prefaced by needed SHA3_Move instructions to restore state, and the state-master bits ("S") is set. If the state-master bits ("S") is not set, SHA3_MoveFrom_S is treated as no-op. A "no-op" or NOP, no-op, or NOOP (short for no operation) is a machine language instruction and its assembly language mnemonic, programming language statement, or computer protocol command that does nothing.

Figure 10:
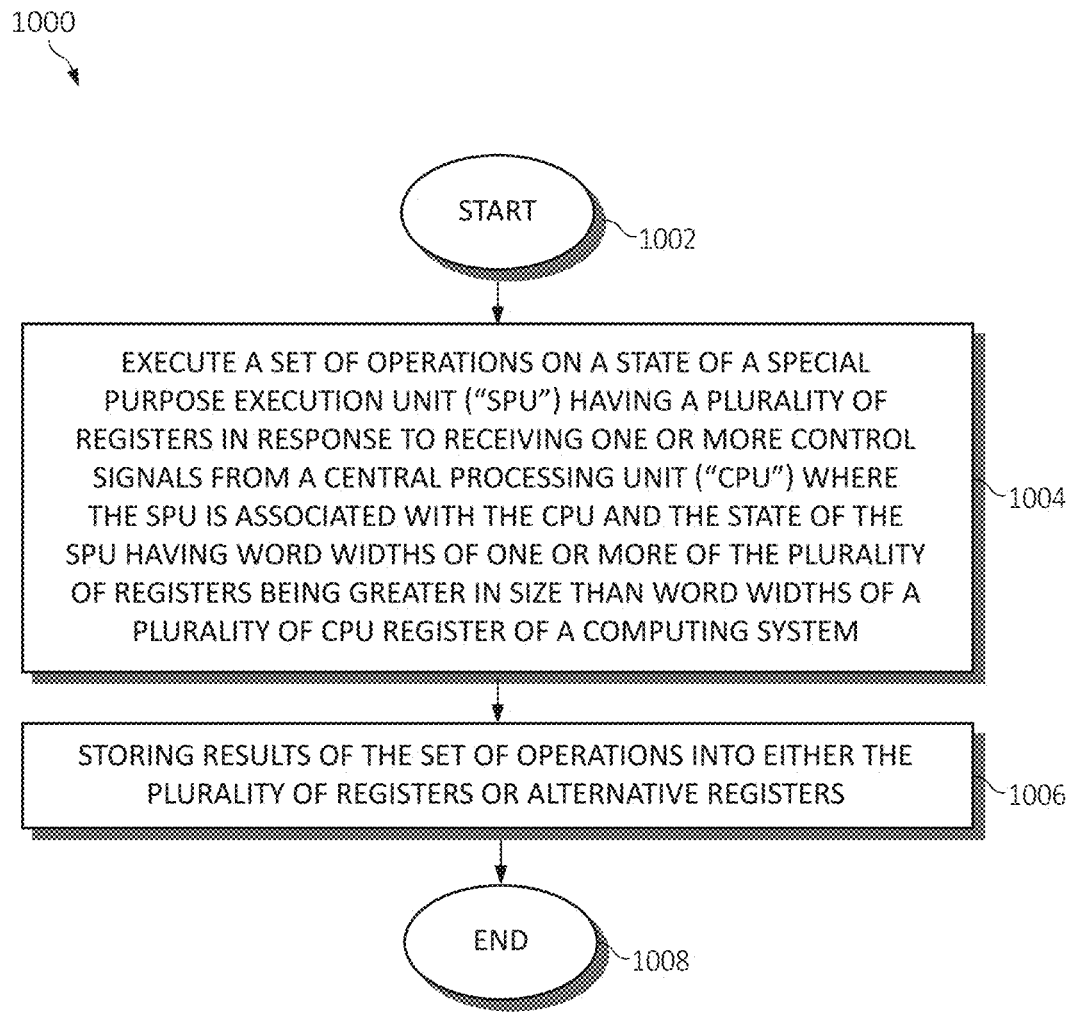
FIG. 10 is a flowchart diagram depicting an exemplary method for supporting large-word operations in a Reduced Instruction Set Computer ("RISC") in a computing environment, by a processor, in which aspects of the present invention may be realized.

Turning now to FIG. 10, a method 1000 for supporting large-word operations in a Reduced Instruction Set Computer ("RISC") in a computing environment using a processor is depicted, in which various aspects of the illustrated embodiments may be implemented. The functionality 1000 may be implemented as a method (e.g., a computer-implemented method) executed as instructions on a machine, where the instructions are included on at least one computer readable medium or one non-transitory machine-readable storage medium. The functionality 1000 may start in block 1002.

In response to receiving one or more control signals from a central processing unit ("CPU"), a set of operations may be executed on a state of a special purpose execution unit ("SPU") having a plurality of SPU registers, the SPU being associated with the CPU and the state of the SPU having word widths of one or more of the plurality of registers being greater in size than word widths of a plurality of CPU registers of a computing system and a set of state-master bits to synchronize the state of the SPU and a state of the CPU, as in block 1004. The results of the set of operations are stored in the plurality of CPU registers or in an alternative set of the plurality of SPU registers, as in block 1006. The functionality 1000 may end, as in block 1008.

In one aspect, in conjunction with and/or as part of at least one blocks of FIG. 10, the operations of method 1000 may include each of the following. The operations of 1000 may overlay the state of each of a plurality of registers of the SPU with the plurality of CPU registers in the CPU. The operations of 1000 may copy the state of the plurality of CPU registers to a register of the SPU using a set of move internal operations. The operations of 1000 may copy the state of the plurality of registers of the SPU to the plurality of CPU registers using the set of move internal operations.

The operations of 1000 may replicate the state of the SPU for each of a plurality of threads of the SPU and pipeline compute instructions issued by each of the plurality of threads of the SPU.

The operations of 1000 may execute, by the SPU, instructions to perform a round of a state-permute functions of secure hash algorithm-3 ("SHA-3") where the state of the SPU is a width of a first register with at least an n number of bits and a second register with an m number of bits, wherein n and m are positive integers. The operations of 1000 may execute, by the SPU, instructions to perform a plurality of rounds of a state-permute functions of secure hash algorithm-3 ("SHA-3").

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The descriptions of the embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for supporting large-word operations in a computing environment by one or more processors comprising:
    in response to receiving one or more control signals from a central processing unit ("CPU"), executing a set of operations on a state of a special purpose execution unit ("SPU") having a plurality of SPU registers, wherein word widths of one or more of the plurality of SPU registers are each greater in size than word widths of a plurality of CPU registers of the CPU, and wherein a set of state-master bits are used to synchronize the state of the SPU and a state of the CPU; and
    storing results of the set of operations in the plurality of CPU registers or an alternative set of the plurality of SPU registers.

2. The method of claim 1, further including overlaying the state of the plurality of SPU registers with the plurality of CPU registers in the CPU.

3. The method of claim 1, further including copying the state of the plurality of CPU registers to the plurality of SPU registers using a set of compute instructions or CPU internal operations.

4. The method of claim 1, further including copying the state of the plurality of SPU registers to the plurality of CPU registers using the set of compute instructions.

5. The method of claim 1, further including:
    replicating the state of the SPU for each of a plurality of threads of the SPU; and
    pipelining compute instructions issued by each of the plurality of threads of the SPU.

6. The method of claim 1, further including implementing, by the SPU, instructions to perform a round of a state-permute functions of secure hash algorithm-3 ("SHA-3") where the state of the SPU is a width of a first register with at least an n number of bits and a second register with an m number of bits, wherein n and m are positive integers.

7. The method of claim 1, further including:
    executing, by the SPU, a plurality of instructions to perform a plurality of rounds of a state-permute functions of secure hash algorithm-3 ("SHA-3"); and
    using one or more different coherence protocols between the plurality of CPU registers and the alternative set of the plurality of SPU registers with the plurality of instructions.

8. A system for supporting large-word operations in a processor in a computing environment, comprising:
    one or more computers with executable instructions that when executed cause the system to:
        in response to receiving one or more control signals from a central processing unit ("CPU"), execute a set of operations on a state of a special purpose execution unit ("SPU") having a plurality of SPU registers, wherein word widths of one or more of the plurality of SPU registers are each greater in size than word widths of a plurality of CPU registers of the CPU, and wherein a set of state-master bits are used to synchronize the state of the SPU and a state of the CPU; and store results of the set of operations in the plurality of CPU registers or an alternative set of the plurality of SPU registers.

9. The system of claim 8, wherein the executable instructions when executed cause the system to overlay the state of the plurality of SPU registers with the plurality of CPU registers in the CPU.

10. The system of claim 8, wherein the executable instructions when executed cause the system to copy the state of the plurality of CPU registers to the plurality of SPU registers using a set of compute instructions or CPU internal operation.

11. The system of claim 8, wherein the executable instructions when executed cause the system to copy the state of the plurality of SPU registers to the plurality of CPU registers using the set of compute instructions.

12. The system of claim 8, wherein the executable instructions when executed cause the system to:
    replicate the state of the SPU for each of a plurality of threads of the SPU; and
    pipeline compute instructions issued by each of the plurality of threads of the SPU.

13. The system of claim 8, wherein the executable instructions when executed cause the system to execute, by the SPU, instructions to perform a round of a state-permute functions of secure hash algorithm-3 ("SHA-3") where the state of the SPU is a width of a first register with at least an n number of bits and a second register with an m number of bits, wherein n and m are positive integers.

14. The system of claim 8, wherein the executable instructions when executed cause the system to:
    execute, by the SPU, a plurality of instructions to perform a plurality of rounds of a state-permute functions of secure hash algorithm-3 ("SHA-3"); and
    use one or more different coherence protocols between the plurality of CPU registers and the alternative set of the plurality of SPU registers with the plurality of instructions.

15. A computer program product for supporting large-word operations in a processor in a computing environment, the computer program product comprising:
    one or more computer readable storage media, and program instructions collectively stored on the one or more computer readable storage media, the program instruction comprising:
    in response to receiving one or more control signals from a central processing unit ("CPU"):
    program instructions to execute a set of operations on a state of a special purpose execution unit ("SPU") having a plurality of SPU registers, wherein word widths of one or more of the plurality of SPU registers are each greater in size than word widths of a plurality of CPU registers of the CPU, and wherein a set of state-master bits are used to synchronize the state of the SPU and a state of the CPU; and
    program instructions to store results of the set of operations in the plurality of CPU registers or an alternative set of the plurality of SPU registers.

16. The computer program product of claim 15, further including program instructions to overlay the state of the plurality of SPU registers with the plurality of CPU registers in the CPU.

17. The computer program product of claim 15, further including program instructions to:
    copy the state of the plurality of CPU registers to the plurality of SPU registers using a set of compute instructions or CPU internal operations; and
    copy the state of the plurality of SPU registers to the plurality of CPU registers using the set of compute instructions.

18. The computer program product of claim 15, further including program instructions to:
    replicate the state of the SPU for each of a plurality of threads of the SPU; and
    pipeline compute instructions issued by each of the plurality of threads of the SPU.

19. The computer program product of claim 15, further including program instructions to execute, by the SPU, instructions to perform a round of a state-permute functions of secure hash algorithm-3 ("SHA-3") where the state of the SPU is a width of a first register with at least an n number of bits and a second register with an m number of bits, wherein n and m are positive integers.

20. The computer program product of claim 15, further including program instructions to
    execute, by the SPU, a plurality of instructions to perform a plurality of rounds of a state-permute functions of secure hash algorithm-3 ("SHA-3"); and
    use one or more different coherence protocols between the plurality of CPU registers and the alternative set of the plurality of SPU registers with the plurality of instructions.

* * * * *